United States Patent
Kawaguchi (10) Patent No.: US 8,958,119 B2
(45) Date of Patent: Feb. 17, 2015

(54) REDUCING THE AMOUNT OF TONER USED IN PRINTING

(71) Applicant: KYOCERA Document Solutions Inc., Osaka (JP)

(72) Inventor: Shinichi Kawaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/091,696

(22) Filed: Nov. 27, 2013

(65) Prior Publication Data
US 2014/0146328 A1  May 29, 2014

(30) Foreign Application Priority Data
Nov. 29, 2012  (JP) ................................. 2012-261561

(51) Int. Cl.
G06F 3/12 (2006.01)
G06K 15/02 (2006.01)
G06K 15/00 (2006.01)
H04N 1/00 (2006.01)

(52) U.S. Cl.
CPC .......... *G06K 15/1869* (2013.01); *G06K 15/002* (2013.01); *H04N 1/00* (2013.01); *G06K 15/1885* (2013.01)
USPC ......................................................... 358/1.2

(58) Field of Classification Search
CPC ...................................................... G06F 3/1219
USPC ............................................................ 358/1.2
See application file for complete search history.

(56) References Cited

FOREIGN PATENT DOCUMENTS

| JP | 2000-301768 |   | 10/2000 |
| JP | 2002-300369 |   | 10/2002 |
| JP | 2004-017389 | A * | 1/2004 |

* cited by examiner

*Primary Examiner* — Eric A Rust
(74) *Attorney, Agent, or Firm* — Knobbe, Martens, Olson & Bear, LLP (57) ABSTRACT

An image processing device includes a data acquisition unit, an instruction receiving unit, an image conversion pattern storage unit, and an image processing unit. The image conversion pattern storage unit stores a plurality of image conversion patterns having different dot thinning ratios and scaling ratios corresponding to the respective image conversion patterns, in which the image conversion patterns having smaller dot thinning ratios are mapped to greater scaling ratios. The image processing unit reads the image conversion pattern mapped to the scaling ratio designated for the n-up printing out of the image conversion pattern storage unit when the instructions to carry out the n-up printing and the toner-saving printing are received by the instruction receiving unit, and performs image processing on the image data acquired by the data acquisition unit using the image conversion pattern.

6 Claims, 8 Drawing Sheets

MASK PATTERN m1

| 1 | 0 | 1 | 0 |
|---|---|---|---|
| 0 | 0 | 0 | 0 |
| 1 | 0 | 1 | 0 |
| 0 | 0 | 0 | 0 |

MASK PATTERN m2

| 1 | 0 | 1 | 0 |
|---|---|---|---|
| 0 | 1 | 0 | 1 |
| 1 | 0 | 1 | 0 |
| 0 | 1 | 0 | 1 |

MASK PATTERN m3

| 1 | 1 | 1 | 1 |
|---|---|---|---|
| 0 | 1 | 0 | 1 |
| 1 | 1 | 1 | 1 |
| 0 | 1 | 0 | 1 |

REDUCING THE AMOUNT OF TONER USED IN PRINTING

INCORPORATION BY REFERENCE

This application claims priority to Japanese Patent Application No. 2012-261561 filed on 29, Nov. 2012, the entire contents of which are incorporated by reference herein.

BACKGROUND

The present disclosure relates to an image processing device, an image forming apparatus, and a computer-readable non-transitory storage medium with an image processing program stored thereon and, more particularly, to image processing in which an amount of toner used in printing is reduced.

In image forming apparatuses such as a copier and a printer, technology for performing image processing in which image data serving as a printing target is reduced for the purpose of n-up printing in which printing is performed on one sheet of recording paper on which multiple pages of a document are collected is used. When copies of the multiple pages are printed by the n-up printing, recording paper can be saved. Further, in the image forming apparatuses, technology for performing toner-saving printing by performing image processing in which image data is masked using a preset mask pattern to reduce an amount of toner used when an image of a printing target is printed is also used.

SUMMARY

Technology that further improves the aforementioned technology is proposed in the present disclosure.

An image processing device according to an aspect of the present disclosure includes a data acquisition unit, an instruction receiving unit, an image conversion pattern storage unit, and an image processing unit.

The data acquisition unit acquires image data serving as a printing target.

The instruction receiving unit receives, from an operator, an instruction to carry out n-up printing for which a scaling ratio is designated and an instruction to carry out toner-saving printing that is printing in which an amount of toner used is reduced.

The image conversion pattern storage unit stores a plurality of image conversion patterns having different dot thinning ratios and scaling ratios corresponding to the respective image conversion patterns, in which the image conversion patterns having smaller dot thinning ratios are mapped to greater scaling ratios.

The image processing unit reads the image conversion pattern mapped to the scaling ratio designated for the n-up printing out of the image conversion pattern storage unit when the instructions to carry out the n-up printing and the toner-saving printing are received by the instruction receiving unit, and performs image processing on the image data acquired by the data acquisition unit using the image conversion pattern.

Further, an image forming apparatus according to another aspect of the present disclosure includes the image processing device and a printing unit. The printing unit performs printing using the image data on which the image processing is performed by the image processing unit.

In addition, a computer readable nonvolatile recording medium storing an image processing program according to yet another aspect of the present disclosure is designed so that the corresponding image processing program causes a computer to function as the data acquisition unit, the instruction receiving unit, the image conversion pattern storage unit, and the image processing unit.

DETAILED DESCRIPTION

Figure 1:
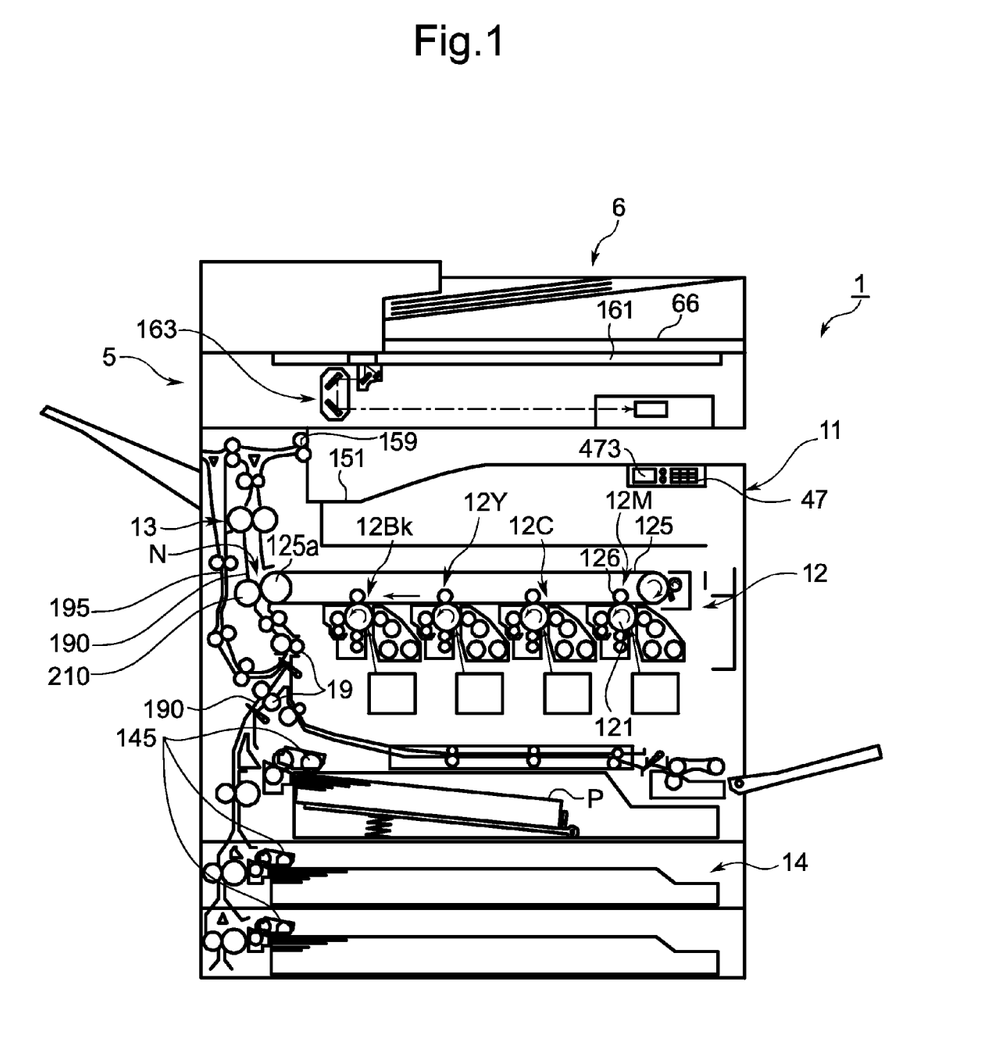
FIG. 1 is a front cross-sectional view showing a structure of an image forming apparatus equipped with an image processing device according to an embodiment of the present disclosure.

Hereinafter, an image processing device, an image forming apparatus, an image processing program, and a computer readable nonvolatile recording medium storing the image processing program according to an embodiment will be described as an aspect of the present disclosure with reference to the attached drawings. FIG. 1 is a front cross-sectional view showing a structure of an image forming apparatus equipped with an image processing device according to an embodiment of the present disclosure.

An image forming apparatus 1 according to an embodiment of the present disclosure is a multifunction device combining a plurality of functions such as a copy function, a printer function, a scanner function, and a facsimile function. The image forming apparatus 1 includes an apparatus main body 11 equipped with an operation unit 47, an image forming unit 12, a fixing unit 13, a paper feed unit 14, a document conveying unit 6, and a document reading unit 5.

The operation unit 47 receives instructions, such as an instruction to implement an image forming operation and an instruction to implement a document reading operation, from an operator with regard to various operations and processes which can be implemented by the image forming apparatus 1. The operation unit 47 is equipped with a display unit 473 that displays an operation guide for the operator.

When the image forming apparatus 1 performs the document reading operation, the document reading unit 5 optically reads an image of a document fed by the document conveying unit 6 or a document placed on a document table glass 161 to generate image data. The image data generated by the document reading unit 5 is stored in an internal hard disk drive (HDD) or a networked computer.

When the image forming apparatus 1 performs the image forming operation, the image forming unit (printing unit) 12 forms a toner image on recording paper P as a recording medium fed from the paper feed unit 14 based on the image data generated by the document reading operation, the image data received from the networked computer, or the image data stored in the internal HDD. When color printing is carried out, an image forming unit 12M for magenta, an image forming unit 12C for cyan, an image forming unit 12Y for yellow, and an image forming unit 12Bk for black of the image forming unit 12 cause the toner images to be formed on photosensitive drums 121 based on images composed of respective color components constituting the image data by charging, exposure, and developing processes, and cause the toner images to be transferred to an intermediate transfer belt 125 by primary transfer rollers 126.

Each chromatic toner image transferred to the intermediate transfer belt 125 is superimposed on the intermediate transfer belt 125 by adjusting transfer timing, thereby becoming a color toner image. A secondary transfer roller 210 causes the color toner image formed on a surface of the intermediate transfer belt 125 to be transferred to the recording paper P, which is conveyed from the paper feed unit 14 along a conveying path 190, at a nip zone N between the secondary transfer roller 210 and a driving roller 125a with the intermediate transfer belt 125 sandwiched therebetween. Afterwards, the fixing unit 13 causes the toner image on the recording paper P to be fixed to the recording paper P by thermocompression. The recording paper P on which the fixing process is completed and on which a color image is formed is ejected to an eject tray 151.

The paper feed unit 14 is equipped with a plurality of paper feed cassettes. A controller 100 (FIG. 2) rotatably drives a pickup roller 145 of the paper feed cassette in which the recording paper having a size designated by an instruction from the operator is contained, and conveys the recording paper P contained in each paper feed cassette toward the nip zone N.

In the image forming apparatus 1, when double-side printing is carried out, the recording paper P, on one side of which the image is formed by the image forming unit 12, is nipped in an eject roller pair 159. In this state, the recording paper P is switched back by the eject roller pair 159, is sent to a reverse conveying path 195, and is re-conveyed to an upstream region in the conveying direction of the recording paper P with respect to the nip zone N and the fixing unit 13 by a conveying roller pair 19. Thereby, an image is formed on the other side of the recording paper by the image forming unit 12.

Figure 2:
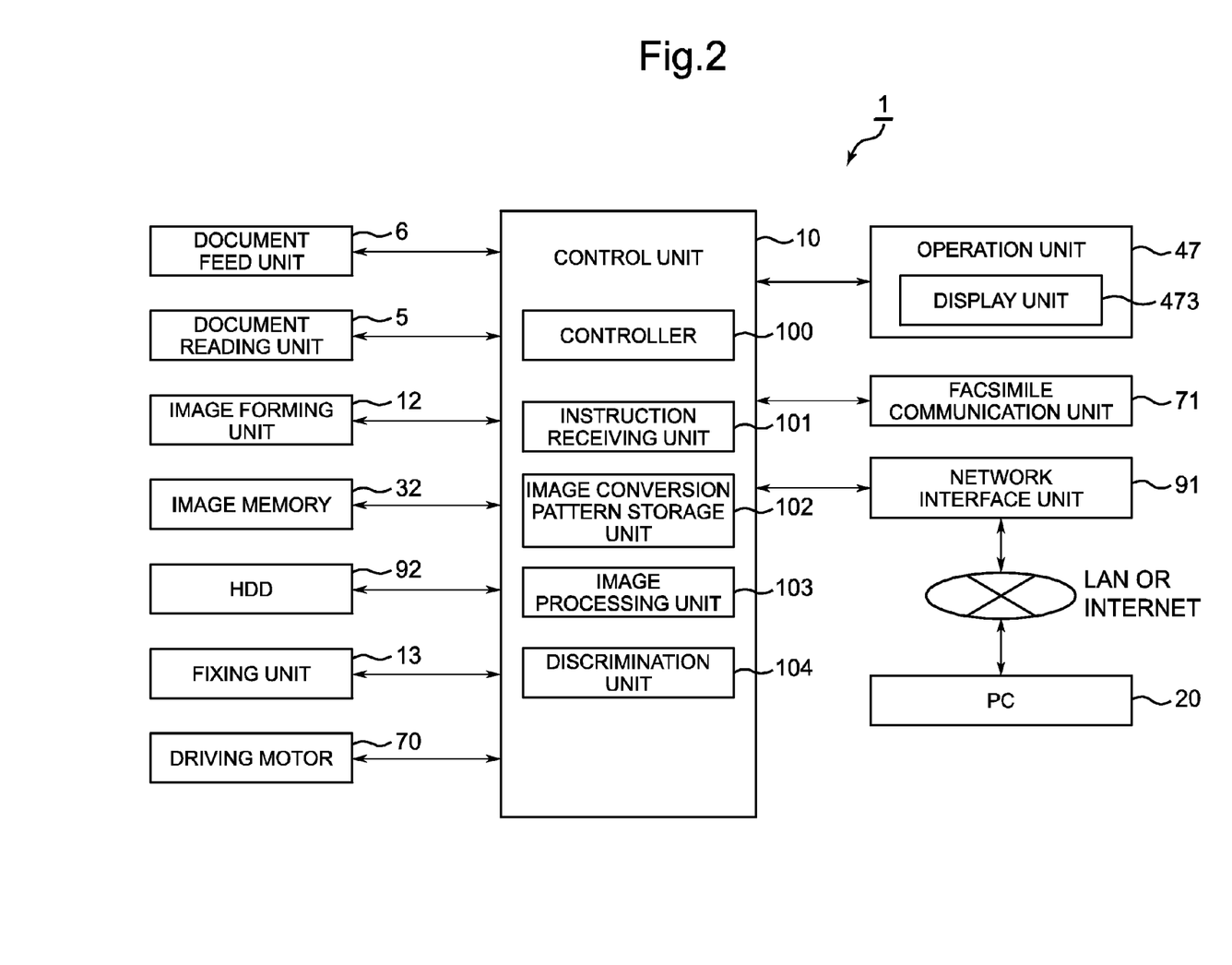
FIG. 2 is a functional block diagram showing a major internal constitution of the image forming apparatus.

FIG. 2 is a functional block diagram showing a major internal constitution of the image forming apparatus 1. The image forming apparatus 1 is equipped with a control unit 10, the operation unit 47, the document conveying unit 6, the document reading unit 5, an image memory 32, the image forming unit 12, the fixing unit 13, a driving motor 70, a facsimile communication unit 71, a network interface unit 91, and an HDD 92.

The document reading unit (data acquiring unit) 5 is equipped with a reading mechanism 163 (FIG. 1) having a light irradiator and a charge-coupled device (CCD) sensor under the control of the control unit 10. The document reading unit 5 reads the image from the document in such a manner that the document is irradiated by the light irradiator and reflected light is received by the CCD sensor.

The image memory 32 is a region that temporarily stores data of the document image obtained by the reading of the document reading unit 5 and that temporarily preserves data serving as a print target of the image forming unit 12.

The facsimile communication unit 71 is equipped with an encoding/decoding unit, a modulation/demodulation unit, and a network control unit (NCU), and performs transmission of a facsimile using a public telephone line network.

The network interface unit 91 is made up of a communication module such as a local area network (LAN) board, and transmits/receives various data to/from the computer 200 within a local area or on the Internet via a LAN connected to the network interface unit 91. The network interface unit 91 is an example of the data acquiring unit in the scope of the claims.

The HDD 92 is a high-capacity storage device that stores the document image read by the document reading unit 5.

The driving motor 70 is a drive source that provides a rotation driving force to each rotary member of the image forming unit 12 and the conveying roller pair 19.

The control unit 10 is made up of a central processing unit (CPU), a random-access memory (RAM), a read-only memory (ROM), and a dedicated hardware circuit, and oversees overall operation control of the image forming apparatus 1. The control unit 10 is equipped with the controller 100, an instruction receiving unit 101, an image conversion pattern storage unit 102, an image processing unit 103, and a determination unit 104.

The controller 100 is connected to the operation unit 47, the document conveying unit 6, the document reading unit 5, the image memory 32, the image forming unit 12, the fixing unit 13, the driving motor 70, the facsimile communication unit 71, the network interface unit 91, and the HDD 92, and controls each of these components.

The instruction receiving unit 101 receives an instruction to carry out n-up printing and an instruction to carry out toner-saving printing either by means of an operation of the operation unit 47 of an operator or from a personal computer (PC) 20 on the network via the network interface unit 91. N-up printing refers to a printing method of reducing image data corresponding to multiple pages of a document by organizing a layout that can be printed on a sheet of recording paper, and printing the image data on the sheet of recording paper. The instruction receiving unit 101 receives designation of a scaling ratio, i.e. designation of how many pages of image data of the document are collected on one sheet, as the instruction to carry out n-up printing. Further, the toner-saving printing refers to a printing method of further reducing a toner usage amount than that originally required to print the image data that is the printing target, and printing the corresponding image data.

The image conversion pattern storage unit 102 has a data table in which a plurality of image conversion patterns having different dot thinning ratios with respect to the image data and scaling ratios corresponding to the respective image conversion patterns are stored with the image conversion patterns, in which the image conversion patterns having smaller dot thinning ratios are mapped to greater scaling ratios. In the present embodiment, as the image conversion pattern, (1) a mask pattern used for masking or (2) a gamma conversion pattern used for gamma conversion processing is stored.

Figure 3:
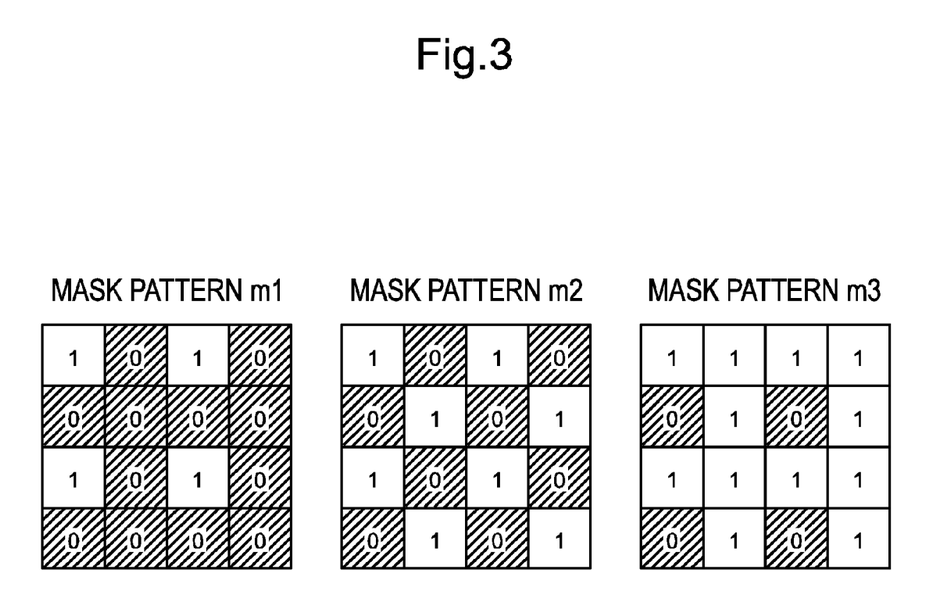
FIG. 3 is a diagram showing an example of mask patterns stored in an image conversion pattern storage unit according to scaling ratios.
Figure 4:
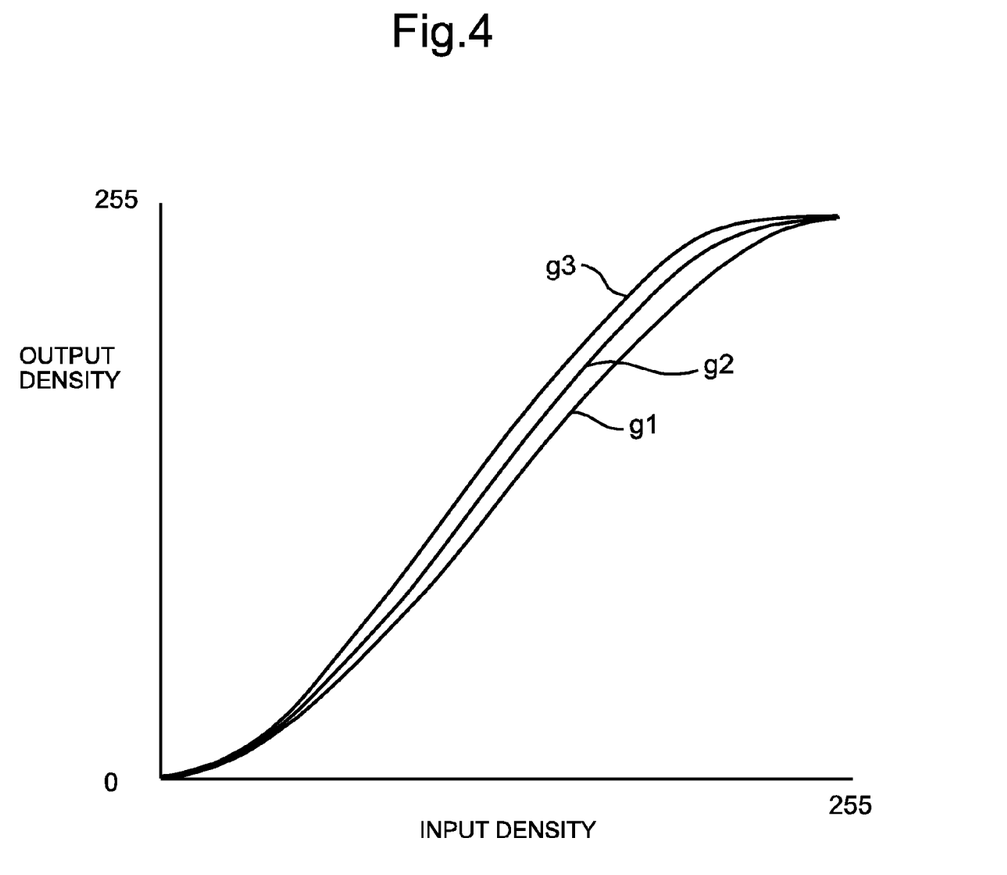
FIG. 4 is a diagram showing a characteristic of each gamma conversion pattern.

The image conversion patterns stored in the image conversion pattern storage unit 102 will be described. FIG. 3 is a diagram showing an example of the mask patterns stored in the image conversion pattern storage unit 102 according to a scaling ratio. FIG. 4 is a diagram showing a characteristic of each gamma conversion pattern.

For example, as shown in FIG. 3, three types of mask patterns made up of 4 pixels×4 pixels are stored in the image conversion pattern storage unit 102. The mask pattern m1 has a printing rate of 25% (=4 pixels/16 pixels), the mask pattern m2 has a printing rate of 50% (=8 pixels/16 pixels), and the mask pattern m3 has a printing rate of 75% (=12 pixels/16 pixels). In each mask pattern shown in FIG. 3, the pixels indicated by "1" are pixels that are printed, and the pixels indicated by "0" are pixels that are not printed.

These mask pattern m1 to m3 are mapped to the respective different scaling ratios. Here, the scaling ratios are indicated by the number of pages collected on one page in the event of the n-up printing. For example, the scaling ratio when two pages of the document are collected on one page is denoted by 2in1, and the scaling ratio when four pages of the document are collected on one page is denoted by 4in1. In the present embodiment, the case in which the scaling ratio has the two types will be described as an example.

The mask pattern m1 (printing rate of 25%) is used for masking when only the toner-saving printing is carried out, without carrying out the n-up printing (scaling ratio 1in1). In other words, the mask pattern m1 is mapped to the scaling ratio 1in1. The mask pattern m2 (printing rate of 50%) is mapped to the scaling ratio 2in1. The mask pattern m3 (printing rate of 75%) is mapped to the scaling ratio 4in1. The image conversion pattern storage unit 102 stores these mask patterns and the mapped scaling ratios in the data table. In other words, the plurality of mask patterns having different dot thinning ratios corresponding to the respective scaling ratio are stored in the image conversion pattern storage unit 102. The mask patterns having smaller dot thinning ratios are mapped to greater scaling ratios.

Further, when the gamma conversion patterns are stored as the image conversion patterns in the image conversion pattern storage unit 102 with the gamma conversion patterns mapped to the scaling ratios, relational expressions corresponding to the characteristics shown in FIG. 4 are stored in the image conversion pattern storage unit 102 as the gamma conversion patterns g1 to g3. The gamma conversion processing is image conversion processing of further lowering a density at a low density portion of the image data, and lowering a density at a high density portion with an amount of decrease in density suppressed compared to that of the low density portion.

These gamma conversion patterns g1 to g3 are mapped to the respective different scaling ratios. The gamma conversion pattern g1 (whose medium density portion has a high contrast and whose characteristic is denoted by g1 in FIG. 4) is mapped to the scaling ratio 1in1. The gamma conversion pattern g2 (whose medium density portion has a medium contrast and whose characteristic is denoted by g2 in FIG. 4) is mapped to the scaling ratio 2in1. The gamma conversion pattern g3 (whose medium density portion has a low contrast and whose characteristic is denoted by g3 in FIG. 4) is mapped to the scaling ratio 4in1. The image conversion pattern storage unit 102 stores the gamma conversion patterns g1 to g3 and the scaling ratios mapped to the gamma conversion patterns in the data table. In other words, the plurality of gamma conversion patterns having different dot thinning ratios corresponding to the respective scaling ratio are stored in the image conversion pattern storage unit 102. The gamma conversion patterns having smaller dot thinning ratios are mapped to greater scaling ratios.

The image processing unit 103 performs image processing on the image data as the printing target using the image conversion patterns stored in the image conversion pattern storage unit 102. When an instruction to carry out both the n-up printing and the toner-saving printing on the image data serving as the printing target is received by the instruction receiving unit 101, the image processing unit 103 reads the image conversion patterns mapped to the scaling ratios designated for the corresponding n-up printing out of the image conversion pattern storage unit 102, and performs the image processing on the image data serving as the printing target that is acquired by the document reading unit 5 or the network interface unit 91 using the image conversion patterns.

The determination unit 104 determines whether the image data serving as the printing target that is acquired by the document reading unit 5 or the network interface unit 91 is a text image or a graphic image in units of pages of the image data. Hereinafter, a page composed of a text image is indicated as a text image page, and a page composed of a graphic image is indicated as a graphic image page.

The determination unit 104 uses, for instance, an edge detection processing method as technology for discriminating a text image from the image data. In this case, the determination unit 104 uses pixels constituting the image representing the image data serving as the printing target as sequential relevant pixels, extracts such relevant pixels and peripheral pixels, and performs filtering on these pixels using an edge detection filter, thereby performing edge detection processing of detecting edge pixels constituting an image contour. Then, when an edge is detected in the edge detection processing, the determination unit 104 determines the relevant pixels to be the edge pixels, and determines a text image based on the corresponding edge pixels. For example, the determination unit 104 calculates difference values in brightness between the relevant pixel and eight surrounding pixels adjacent to the relevant pixel. When the difference values having a greater value than a given threshold value are a predetermined number (e.g. four or more), the determination unit 104 determines that the attention pixel is an edge pixel constituting a text image. The determination unit 104 determines an image in which a number of the corresponding edge pixels is above a preset threshold value as a text image. When a distribution density of the corresponding text image in the image of one document page is determined to be higher than a prescribed density (e.g., 20%), the determination unit 104 determines the image data of the corresponding document page to be a text image page. Further, when the distribution density of the corresponding text image in the image data of the one document page is determined to be equal to or less than the prescribed density, the determination unit 104 determines the image data of the corresponding document page to be a graphic image page. The corresponding graphic image includes a photographic image, a figure image, a pictorial image, and so on.

Further, the image conversion pattern storage unit 102 additionally stores the image conversion patterns (the mask patterns or the gamma conversion patterns) of the dot thinning ratios set for the image processing of the graphic image. The dot thinning ratios of the image conversion patterns for the graphic image are stored as fixed values regardless of the scaling ratios for the n-up printing. The image conversion pattern storage unit 102 stores the mask pattern m1 or the gamma conversion pattern g1 as the image conversion pattern of the dot thinning ratio set for the image processing of the graphic image.

Further, when the instruction to carry out both the n-up printing and the toner-saving printing is received by the instruction receiving unit 101, the image processing unit 103 performs the image processing on the image data of the text image page determined by the determination unit 104 using the image conversion patterns mapped to the scaling ratios, and on the image data correspond to the graphic image page determined by the determination unit 104 using the image conversion patterns for the image processing of the graphic image.

The image processing device according to an embodiment of the present disclosure is equipped with the instruction receiving unit 101, the image conversion pattern storage unit 102, the image processing unit 103, and the determination unit 104. However, the determination unit 104 is used as a component of the image processing device according to an embodiment of the present disclosure as far as it is needed in an embodiment described below.

The control unit 10 functions as the controller 100 (a function associated with the image processing to be described below when carrying out the n-up printing and the toner-saving printing at the same time), the instruction receiving unit 101, the image conversion pattern storage unit 102, the image processing unit 103, and the determination unit 104 based on an operation according to an image processing program installed in the HDD 92. However, the controller 100, the instruction receiving unit 101, the image conversion pattern storage unit 102, the image processing unit 103, and the determination unit 104 may be constituted by respective hardware circuits regardless of the operation according to the image processing program executed by the control unit 10. Hereinafter, unless otherwise mentioned in particular, this applies similarly to each embodiment.

Further, the image processing program may be recorded on a computer readable nonvolatile recording medium, for instance a compact disc, a flexible disk, a hard disk, a magneto-optical disc, a digital video disc, a magnetic tape, a Blu-ray Disc, or a semiconductor memory. The image processing program stored in the computer readable nonvolatile recording medium is an embodiment of the present disclosure.

Figure 5:
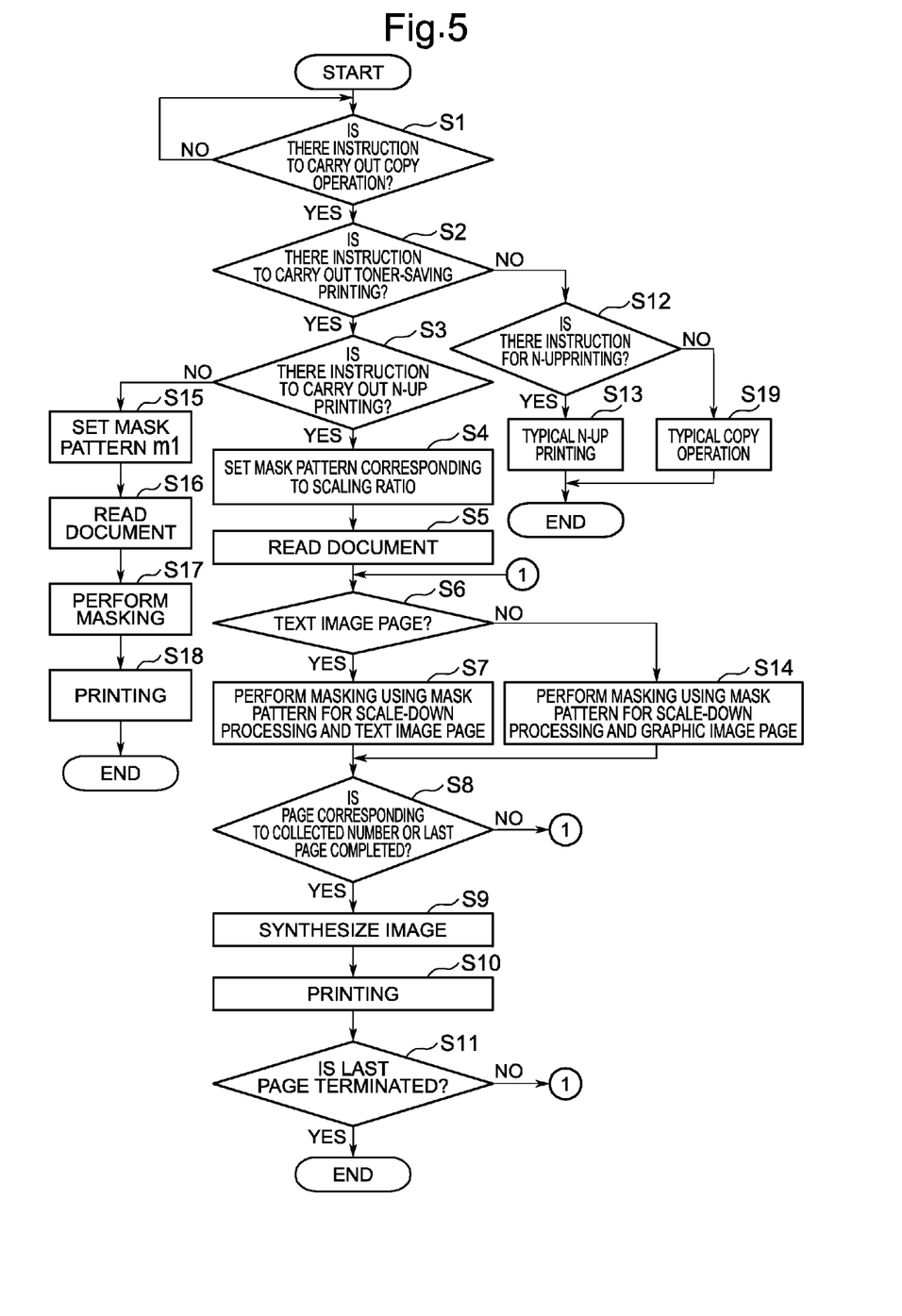
FIG. 5 is a flow chart showing image processing when n-up printing and toner-saving printing are carried out in the image forming apparatus at the same time.
Figure 6A:
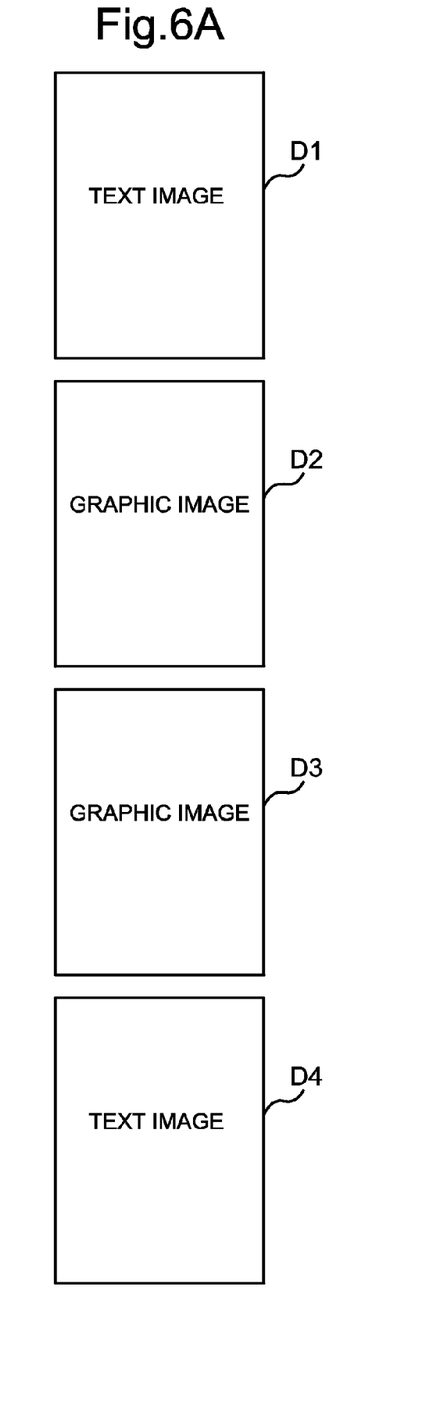
FIGS. 6A to 6C are diagrams showing an example of documents used as reading targets and printed materials obtained by carrying out the n-up printing and the toner-saving printing at the same time.
Figure 6B:
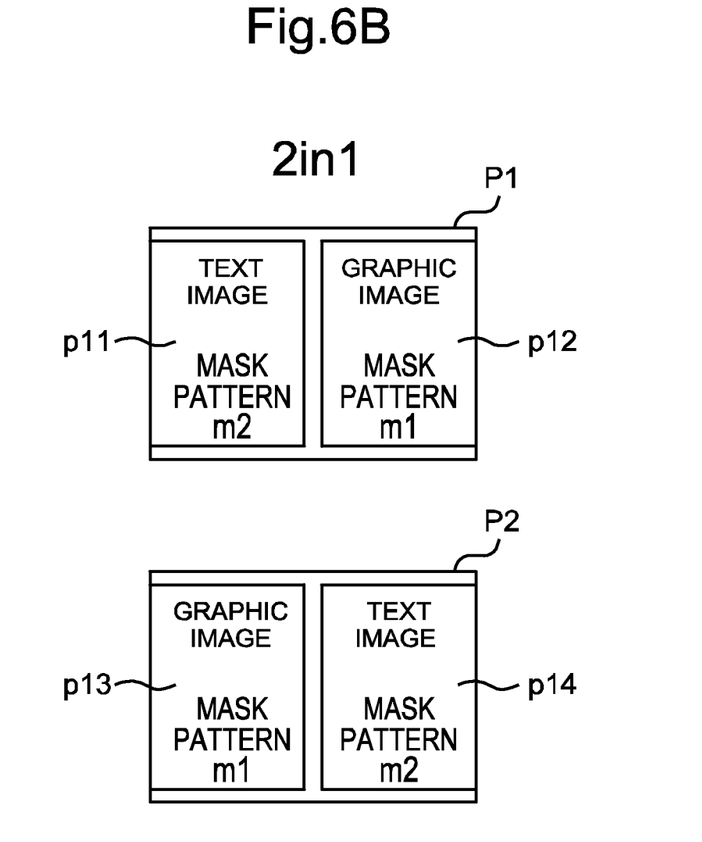
Figure 6C:
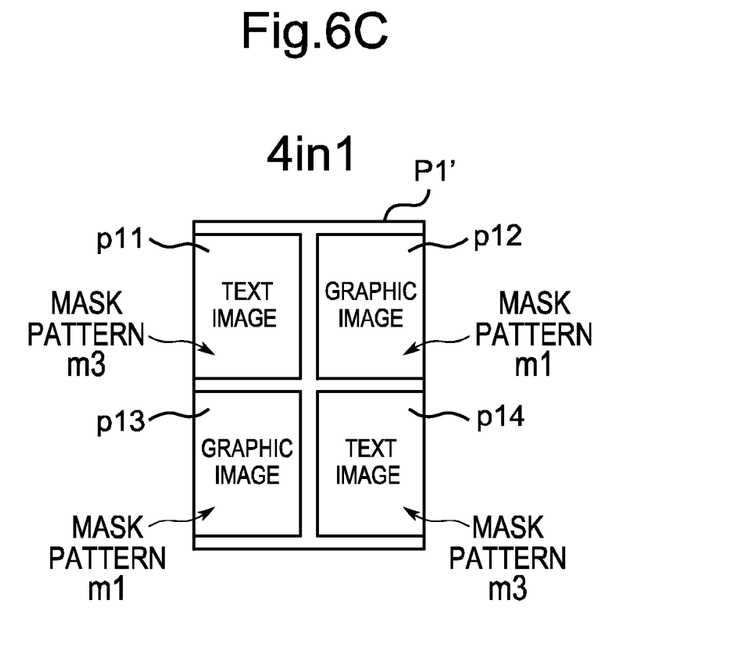

Next, the image processing when the n-up printing and the toner-saving printing are carried out together by the image forming apparatus 1 will be described. FIG. 5 is a flow chart showing the image processing when the n-up printing and the toner-saving printing are carried out in the image forming apparatus at the same time. FIGS. 6A to 6C are diagrams showing an example of documents used as reading targets and printed materials obtained by carrying out the n-up printing and the toner-saving printing at the same time.

The present embodiment is an embodiment in which the image processing unit 103 performs masking as the image processing. Hereinafter, a case in which the image data acquired by document reading of the document reading unit 5 is used as the image data of the printing target will be described as an example. However, the image data acquired from the PC 20 by the network interface unit 91 may be used as image data of the printing target, and subjected to the image processing described below.

When a copy instruction is input through an operation of the operation unit 47 by an operator (YES in S1), the image processing unit 103 determines whether an instruction to carry out the toner-saving printing is received by the instruction receiving unit 101 (S2). Here, if it is determined that the instruction to carry out the toner-saving printing is not received by the instruction receiving unit 101 (NO in S2), the image processing unit 103 determines whether an instruction to carry out the n-up printing is further received by the instruction receiving unit 101 (S12).

When the image processing unit 103 determines that the instruction to carry out the n-up printing is not received (NO in S12), a document reading operation and an image forming operation associated with an copy operation are performed under settings in which neither the toner-saving printing nor the n-up printing is carried out by the controller 100 (S19).

On the other hand, when the image processing unit 103 determines that the instruction to carry out the n-up printing is received (YES in S12), the document reading operation and the image forming operation associated with the copy operation are performed by the controller 100, and conventional general image processing required for the n-up printing is performed on image data acquired in the corresponding document reading operation (S13).

Further, when it is determined in S2 that the instruction to carry out the toner-saving printing is received by the instruction receiving unit 101 (YES in S2), the image processing unit 103 determines whether the instruction to carry out the n-up printing is received by the instruction receiving unit 101 (S3). Here, if the image processing unit 103 determines that the instruction to carry out the n-up printing is not received (NO in S3), the image processing unit 103 reads a mask pattern m1 mapped to a scaling ratio 1in1 out of the image conversion pattern storage unit 102 in order to carry out the toner-saving printing without carrying out the n-up printing, and performs a setting so as to carry out masking on the image data of all pages acquired by document reading of the document reading unit 5 using the corresponding mask pattern m1 (S15).

After S15, the controller 100 causes the document reading unit 5 to begin to read the document placed on a document table 61 to generate data of a document image (S16). Subsequently, the image processing unit 103 performs masking on the image data acquired in the reading of the corresponding document reading unit 5 using the mask pattern m1 (S17). Afterwards, the controller 100 causes the image forming unit 12 to perform image forming (printing) of the corresponding image data (S18).

Further, in S3, when the image processing unit 103 determines that the instruction to carry out the n-up printing is received by the instruction receiving unit 101 (YES in S3), the image processing unit 103 reads the mask patterns corresponding to the scaling ratios designated by the instruction of the corresponding n-up printing out of the image conversion pattern storage unit 102, and sets the corresponding mask patterns as mask patterns used for masking of a text image page among the image data acquired in the reading of the corresponding document reading unit 5 (S4).

For example, when the scaling ratio designated by the instruction of the n-up printing is 2in1, the image processing unit 103 reads a mask pattern m2 mapped to the scaling ratio of the corresponding 2in1 out of the image conversion pattern storage unit 102, and sets the read mask pattern as use for the masking of the text image page. Further, when the scaling ratio is 4in1, the image processing unit 103 reads a mask pattern m3 mapped to the scaling ratio of the corresponding 4in1 out of the image conversion pattern storage unit 102, and sets the read mask pattern as use for the masking of the text image page. The image processing unit 103 reads and sets the mask pattern m1 out of the image conversion pattern storage unit 102 as a mask pattern used for masking of a graphic image page among the image data acquired by the reading of the document reading unit 5, regardless of the designated scaling ratio.

Afterwards, the controller 100 causes the document reading unit 5 to begin to read the document placed on the document table 61 to sequentially generate image data of the read document (S5). In the description of the present embodiment, in S5, the document reading unit 5 is adapted to read all the documents placed on the document table 61, and the image data undergoing the document reading is subjected to each processing below in the page order in which the image data is generated.

Subsequently, with regard to the image data of each page acquired in the corresponding document reading, the determination unit 104 determines whether the image data of each page is a text image page or a graphic image page (S6).

When it is determined that the image data is a text image page (YES in S6), the determination unit 104 scales down the corresponding image data at a reduction ratio corresponding to the designated scaling ratio, and further performs masking using the mask pattern set for the text image page depending on the corresponding scaling ratio at S4 (S7).

On the other hand, when it is determined that the image data is a graphic image page (NO in S6), the determination unit 104 scales down the corresponding image data at a reduction ratio corresponding to the designated scaling ratio, and performs masking using the mask pattern for the graphic image set at S4 again (S14).

When it is determined that the image processing is terminated in terms of the image data corresponding to the pages (N pages in the case of the scaling ratio Nin1) collected on one page indicated by the scaling ratio of the n-up printing for which the instruction is received by the instruction receiving unit 101, or when it is determined that the image processing is terminated in terms of the image data of the last document page (YES in S8), the image processing unit 103 synthesizes the image data corresponding to the relevant page with the image data equivalent to one document page (S9). The controller 100 causes the image forming unit 12 to perform the image forming (printing) on the image data corresponding to one collected page generated in the corresponding synthesis processing (S10).

In S8, when it is determined that the image processing is not terminated by the image processing unit 103 in terms of the image data corresponding to the pages indicated by the scaling ratio of the n-up printing or when it is determined that the image processing is not terminated up to the image data of the last document page (NO in S8), the processing returns to S6.

Afterwards, it is determined whether the image processing is terminated up to the image data of the last document page by the image processing unit 103 (S11). When the image processing is not terminated (NO in S11), the processing returns to S6. When the image processing is terminated (YES in S11), the processing is terminated.

According to the n-up printing and the toner-saving printing described above, and the masking using the mask pattern performed when both of the printings are carried out, examples of the document serving as the reading target for the document reading unit 5 are shown in FIG. 6A. A first document page D1 composed of a text image, second and third document pages D2 and D3 composed of graphic images, and a fourth document page D4 composed of a text image are printed, which will be described.

When the n-up printing and the toner-saving printing of the scaling ratio 2in1 are performed, as shown in FIG. 6B, recording paper P1 of the first page on which the text image page corresponding to two pages is collected and printed is constituted in such a manner that a portion p11 corresponding to the document page D1 serving as the text image page is printed at a printing rate of 50% by the mask pattern m2 and that a portion p12 corresponding to the document page D2 serving as the graphic image page is printed at a printing rate of 25% by the mask pattern m1. Further, recording paper P1 of the second page is constituted in such a manner that a portion p13 corresponding to the document page D3 serving as the graphic image page is printed at a printing rate of 25% by the mask pattern m1, and that a portion p14 corresponding to the document page D4 serving as the text image page is printed at a printing rate of 50% by the mask pattern m2.

On the other hand, when the n-up printing and the toner-saving printing of the scaling ratio 4in1 are performed, as shown in FIG. 6C, recording paper P1 of the first page on which the text image page corresponding to four pages is collected and printed is constituted in such a manner that a portion p11 corresponding to the document page D1 serving as the text image page is printed at a printing rate of 75% by the mask pattern m3, that portions p12 and p13 corresponding to the document pages D2 and D3 serving as the graphic image page are printed at a printing rate of 25% by the mask pattern m1, and that a portion p14 corresponding to the document page D4 serving as the text image page is printed at a printing rate of 75% by the mask pattern m3.

According to the embodiment above, the image conversion pattern storage unit 102 stores the plurality of image conversion patterns having the different dot thinning ratios and the scaling ratios corresponding to the image conversion patterns, in which image conversion patterns having smaller dot thinning ratios are mapped to greater scaling ratios. When the instruction to carry out the n-up printing and the toner-saving printing is received by the instruction receiving unit 101, the image processing unit 103 reads the image conversion patterns mapped to the scaling ratios designated for the corresponding n-up printing out of the image conversion pattern storage unit 102, and performs the image processing on the image data acquired in the document reading of the document reading unit 5 using the corresponding image conversion patterns. As such, even when the toner-saving printing is performed on the image data acquired in the corresponding document reading that has been scaled down for the n-up printing, an amount of toner is restricted depending on the scaling ratio. Thereby, image quality can be secured as far as possible.

In contrast, for example, in the other n-up printing different from that of the present embodiment, the image processing of scaling down image data corresponding to a plurality of pages to generate image data equivalent to one page is performed. Further, in the toner-saving printing, an amount of toner originally required for image printing is reduced, and thereby image quality is lowered. For this reason, when the n-up printing and the toner-saving printing are performed together, text is reduced in the case of, for instance, the text image, and an image is also coarsened by the reduction in the amount of toner. Thus, readability of text is lowered.

However, according to the present embodiment, as described above, the amount of toner is restricted depending on the scaling ratio, and the image quality is secured as much as possible. Thereby, even when the text image is included in a printed result, the n-up printing and the toner-saving printing can be performed together while lowering the readability of the text image as little as possible.

Further, the determination unit 104 determines whether the image data acquired in the document reading is for the text image page or the graphic image page at each page. When it is determined that the image data is for the text image page, the image processing unit 103 performs the image processing using the image conversion pattern corresponding to the scaling ratio. When it is determined that the image data is for the graphic image page, the image processing unit 103 performs the image processing using the image conversion pattern designated for the graphic image. As such, as shown in FIG. 6C by way of example, with respect to the text image whose contour is easily distorted due to reduction of the amount of toner and which has an influence on the readability, the amount of toner is restricted depending on the scaling ratio, and thereby the image quality is secured as much as possible. With respect to the graphic image to which such a problem does not apply, the printing in which an amount of reduction in toner is more than that for the text image is performed, and an effect of the amount of reduction in toner can be guaranteed as much as possible.

In the embodiment above, as the image processing performed in the event of the toner-saving printing, the case of performing the masking has been described. However, in place of this case, the gamma conversion processing may be performed using the gamma conversion pattern stored in the image conversion pattern storage unit 102 depending on the scaling ratio or in a state mapped to the graphic image. In this case, in the embodiment, the mask pattern is changed to use the gamma conversion pattern, and the gamma conversion processing is performed in place of the masking.

Further, in the embodiment, the image processing unit 103 uses the different image conversion patterns (the mask pattern or the gamma conversion pattern) corresponding to each of the text image and the graphic image. However, without being limited thereto, a case in which the different image conversion patterns are used depending only on the scaling ratio without distinguishing the text image and the graphic image is also an embodiment of the present disclosure.

The present disclosure can be variously modified without being limited to the constitution of the embodiments. The constitutions and processings described in each embodiment using FIGS. 1 to 6 are merely one embodiment of the present disclosure, and the constitutions and processings of the present disclosure are not limited thereto.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image processing device comprising:
a data acquisition unit that acquires image data serving as a printing target;
an instruction receiving unit that receives, from an operator, an instruction to carry out n-up printing for which a scaling ratio is designated and an instruction to carry out toner-saving printing that is printing in which an amount of toner used is reduced;
an image conversion pattern storage unit that stores a plurality of image conversion patterns having different dot thinning ratios and scaling ratios corresponding to the respective image conversion patterns, in which image conversion patterns having smaller dot thinning ratios are mapped to greater scaling ratios;
an image processing unit that reads the image conversion pattern mapped to the scaling ratio designated for the n-up printing out of the image conversion pattern storage unit when the instructions to carry out the n-up printing and the toner-saving printing are received by the instruction receiving unit, and performs image processing on the image data acquired by the data acquisition unit using the image conversion pattern; and
a determination unit discriminating whether the image data acquired by the data acquisition unit is a text image or a graphic image in units of pages, wherein
the image conversion pattern storage unit stores the image conversion pattern of the dot thinning ratio set for the image processing of the graphic image, and
when the instructions to carry out the n-up printing and the toner-saving printing are received by the instruction receiving unit, the image processing unit performs the image processing using the image conversion pattern mapped to the scaling ratio on the image data corresponding to the page determined to be the text image by the determination unit, and performs the image processing using the image conversion pattern stored in the image conversion pattern storage unit for graphic image processing on the image data corresponding to the page determined to be the graphic image by the determination unit.

2. The image processing device according to claim 1, wherein the image conversion pattern stored in the image conversion pattern storage unit for the image processing of the graphic image has a greater dot thinning ratio than that used for the n-up printing of the text image, and has a fixed dot thinning ratio regardless of the scaling ratio of the n-up printing.

3. The image processing device according to claim 1, wherein:
the image conversion pattern storage unit stores mask patterns as the image conversion patterns; and
the image processing unit performs masking on the image data acquired by the data acquisition unit using the mask patterns.

4. An image forming apparatus comprising:
the image processing device according to claim 1, and
a printing unit performing printing using the image data on which the image processing is performed by the image processing unit.

5. An image processing device comprising:
a data acquisition unit that acquires image data serving as a printing target;
an instruction receiving unit that receives, from an operator, an instruction to carry out n-up printing for which a scaling ratio is designated and an instruction to carry out toner-saving printing that is printing in which an amount of toner used is reduced;
an image conversion pattern storage unit that stores a plurality of image conversion patterns having different dot thinning ratios and scaling ratios corresponding to the respective image conversion patterns, in which image conversion patterns having smaller dot thinning ratios are mapped to greater scaling ratios; and
an image processing unit that reads the image conversion pattern mapped to the scaling ratio designated for the n-up printing out of the image conversion pattern storage unit when the instructions to carry out the n-up printing and the toner-saving printing are received by the instruction receiving unit, and performs image processing on the image data acquired by the data acquisition unit using the image conversion pattern, wherein
the image conversion pattern storage unit stores, as the image conversion patterns, a plurality of gamma conversion patterns for performing image conversion processing of further lowering a density at a low density portion of the image data and lowering a density at a high density portion with an amount of decrease in density suppressed compared to that of the low density portion, and the gamma conversion patterns having smaller dot thinning ratios are mapped to greater scaling ratios; and
the image processing unit performs the gamma conversion processing on the image data acquired by the data acquisition unit using the gamma conversion patterns.

6. A computer-readable non-transitory storage medium with an image processing program stored thereon, wherein an image processing program makes a computer serve as:
a data acquisition unit that acquires image data serving as a printing target;
an instruction receiving unit that receives, from an operator, an instruction to carry out n-up printing for which a scaling ratio is designated and an instruction to carry out toner-saving printing that is printing in which an amount of toner used is reduced;
an image conversion pattern storage unit that stores a plurality of image conversion patterns having different dot thinning ratios and scaling ratios corresponding to the respective image conversion patterns, in which the image conversion patterns with smaller dot thinning ratios are mapped to greater scaling ratios;

an image processing unit that reads the image conversion pattern mapped to the scaling ratio designated for the n-up printing out of the image conversion pattern storage unit when the instructions to carry out the n-up printing and the toner-saving printing are received by the instruction receiving unit, and performs image processing on the image data acquired by the data acquisition unit using the image conversion pattern; and a determination unit discriminating whether the image data acquired by the data acquisition unit is a text image or a graphic image in units of pages, wherein the image conversion pattern storage unit stores the image conversion pattern of the dot thinning ratio set for the image processing of the graphic image, and when the instructions to carry out the n-up printing and the toner-saving printing are received by the instruction receiving unit, the image processing unit performs the image processing using the image conversion pattern mapped to the scaling ratio on the image data corresponding to the page determined to be the text image by the determination unit, and performs the image processing using the image conversion pattern stored in the image conversion pattern storage unit for graphic image processing on the image data corresponding to the page determined to be the graphic image by the determination unit.

* * * * *